Patented Dec. 30, 1947

2,433,551

UNITED STATES PATENT OFFICE 2,433,551

ANTHRAQUINONE COMPOUNDS

Ernst Gutzwiller, Basel, Switzerland, assignor to Sandoz Ltd., Fribourg, Switzerland No Drawing. Application April 21, 1942, Serial No. 439,942. In Switzerland December 24, 1940

Section 1, Public Law 690, August 8, 1946
Patent expires December 24, 1960

4 Claims. (Cl. 260—379)

The present invention relates to new anthraquinone compounds.

From the technical literature it is known, that 1:4-diamino-6-halogen- and 1:4-aminoalkylamino-6- respectively -7-halogenanthraquinone can be prepared by starting from 1-amino-6- or -7-halogenanthraquinone, which becomes acylated and then nitrated or halogenated. After reduction of the nitro group and saponification of the acylamino group the 1:4-diamino-6-halogenanthraquinone compound will be obtained. The preparation of 1-alkylamino-4-amino-6- respectively -7-halogenanthraquinone compounds is carried out according to the literature by starting from 1-alkylamino-4-bromo-6- or -7-halogen anthraquinones respectively, condensation of these compounds with toluene sulfamide and subsequent saponification of the sulfotolyl group. The processes above cited need, therefore, several operations before the desired products can be obtained (see U. S. Patent 2,134,654).

According to the present invention these and other new anthraquinone compounds can be prepared by condensation of anthraquinone compounds of the general formula

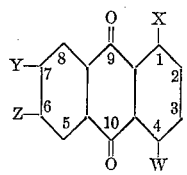

or their leuco compounds, wherein X and W stand for replaceable substituents, Y and Z stand for halogen, or one of the same for a halogen and the other one for hydrogen, with amines of the formula $H_2N-R$, wherein R stands for hydrogen, alkyl and hydroxyalkyl.

In order to prepare the products of the present new process the above cited anthraquinone compounds or their leuco derivatives are heated with the amines at a temperature which is generally between 50° and 200° C. Generally, the condensation is carried out in the presence of diluents like water, methanol, ethanol, aromatic and hydroaromatic hydrocarbons and, in order to accelerate the reaction, there is added for instance alkali metal hydroxides, bicarbonates, carbonates or acetates to the mixture. Sometimes, it is useful to add a small amount of for example copper salts or of boric acid. When the amines used are easily volatile, it is preferable to work in a closed vessel, in order to avoid a loss of the reagents. The isolation of the condensation products is carried out in the usual manner and need not be specifically described.

In this manner and thus in a very simple way anthraquinone compounds can be prepared, while the manufacture thereof according to the method of the U. S. Patent 2,134,654 need different and complicated steps. Further, it is possible to prepare by the present process very valuable dialkylamino- or dihydroxyalkylamino-, or alkylamino-hydroxy-alkylamino compounds, which possess very valuable technical properties. The anthraquinone derivatives obtained by the present process are suitable for the dyeing of organic solvents like petroleum, oils and the like and of plastical masses as well as of acetate rayon. As compared to the known anthraquinone compounds of similar constitution which do not contain in 6- and/or 7-position halogen atoms, the compounds prepared by the present process possess the advantage to have a very good shade in the artificial light.

The following examples, without being limitative, illustrate the present process, the parts being by weight.

*Example 1*

23 parts of 6-chloroquinizarine, 20 parts of sodium hydrosulfite and 90 parts of aqueous ammonia of 25% strength are heated during 6 hours in an autoclave at 80°–100° C. The leuco-1:4-diamino-6-chloroanthraquinone thereby produced can be isolated by filtration and, after washing with water, is dried. It can be transformed into 1:4 - diamino - 6 - chloroanthraquinone by the known methods, e. g., by heating in an air stream at 180° C. or by oxidation, for instance with manganese peroxide in sulfuric acid. The 1:4-diamino-6-chloroanthraquinone dyes acetate rayon in beautiful violet shades.

By using instead of the 6-chloroquinizarine 6:7-dichloroquinizarine, the 1:4-diamino-6:7-dichloroanthraquinone is obtained.

*Example 2*

7 parts of leuco-6-chloroquinizarine, 3 parts of 6-chloroquinizarine, 30 parts of methylamine 40% and 80 parts of ethanol are heated at 80° C., until no more unchanged 6-chloroquinizarine can be detected. For the oxidation of the leuco compound air is blown on the surface of the reaction charge, eventually after addition of some pyridine. After cooling down the reaction product is filtered off and washed with ethanol. The 1:4-dimethylamino-6-chloroanthraquinone thus obtained dyes acetate silk in beautiful blue shades which are stable to artificial light.

Instead of 6-chloroquinizarine (respectively leuco-chloroquinizarine) there can be used 1:4-hydroxyamino-6-chloroanthraquinone or 1:4-diamino-6-chloroanthraquinone, respectively their leuco compounds, whereby on condensation an identical product will be obtained.

*Example 3*

10 parts of leuco-6-chloroquinizarine, 15 parts of monoethanolamine and 65 parts of ethanol are stirred at 80° C., until the leuco-chloroquinizarine has disappeared. After cooling down, the reaction product is filtered and washed with ethanol. The 1:4-dihydroxyethylamino-6-chloroanthraquinone thus obtained dyes acetate rayon in very bright greenish-blue shades of excellent shade in the artificial light and of good fastness to light.

*Example 4*

9.2 parts of leuco-6-chloroquinizarine, 2.3 parts of monoethanolamine, 3.2 parts of methylamine 40% and 50 parts of ethanol are stirred at 65° C., until the reaction has completed. After addition of 0.5 part of pyridine air is blown into the reaction mixture, the condensation product filtered after cooling down and washed with ethanol.

The 1:4-methylaminohydroxyethylamino-6- or -7-chloroanthraquinone respectively thus obtained dyes acetate rayon in brilliant greenish blue shades of excellent shade at the artificial light.

*Example 5*

10 parts of leuco-6:7-dichloroquinizarine, 15 parts of monoethanolamine and 80 parts of ethanol are stirred at 80° C., until the condensation has completed. Then, if necessary, air is blown over the surface of the reaction mixture, eventually after addition of some parts of pyridine or piperidine, in order to produce the oxidation. The dihydroxyethylamino-6:7-dichloroanthraquinone so obtained dyes organic solvents and acetate rayon in greenish-blue brilliant shades.

*Example 6*

10 parts of leuco-6-chloroquinizarine, 15 parts of amylamine, 7 parts of boric acid and 80 parts of amyl alcohol are stirred at 80°-120° C., until the condensation has finished. The 1:4-diamylamino-6-chloroanthraquinone is separated by filtration; it dyes organic solvents like petrol, oil and the like in greenish-blue shades.

By using instead of leuco-6-chloroquinizarine the leuco-6:7-dichloroquinizarine, the 1:4-diamylamino-6:7-dichloroanthraquinone is obtained.

*Example 7*

10 parts of leuco-6:7-dichloroquinizarine, 15 parts of aminodioxypropane and 80 parts of ethanol are stirred at 80° C., until the leuco-6:7-dichloroquinizarine has disappeared. The leuco-1:4-di-(dihydroxypropylamino)-6:7-dichloroanthraquinone is oxidized by a stream of air after addition of 0.5 part of pyridine. After cooling down, the new product is filtered off and washed with alcohol.

The 1:4-di-(dihydroxypropylamino)-6:7-dichloroanthraquinone dyes acetate rayon in brilliant greenish-blue shades.

*Example 8*

10 parts of 6-chloroquinizarine are heated, under stirring, up to 50°-150° C. with 50 parts of monoethanolamine, until the condensation has finished. The condensation product is then isolated in the usual manner and can be purified by crystallisation. It dyes acetate silk in beautiful blue shades and is identical with the product obtained according to Example 3.

Instead of 6-chloroquinizarine there can be used other anthraquinone derivatives substituted in 6-position by a chloro atom and containing in 1- and 4-position replaceable substituents like NH$_2$, NO$_2$, OH, OCH$_3$, halogen and the like. The condensation can be accelerated by addition of alkali, alkali metal carbonates or alkali metal acetates and eventually of metal salts.

What I claim is:

1. An anthraquinone compound of the formula

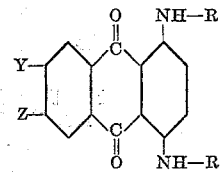

wherein R stands for the same member of the group consisting of alkyl and hydroxyalkyl, and at least one of Y and Z stands for Cl, the other one of Y and Z standing for a member of the group consisting of hydrogen and Cl, said compound being soluble in organic solvents and dyeing acetate rayon in violet to blue shades.

2. An anthraquinone compound of the formula

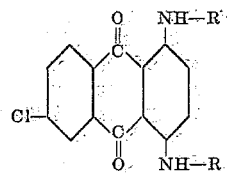

wherein R stands for the same member of the group consisting of alkyl and hydroxylalkyl, said compound being soluble in organic solvents and dyeing acetate rayon in violet to blue shades.

3. The anthraquinone compound of the formula

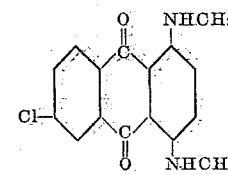

which is soluble in organic solvents and dyes acetate rayon in blue shades.

4. The anthraquinone compound of the formula

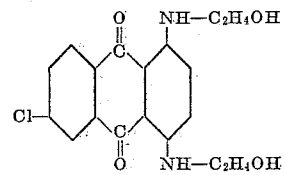

ERNST GUTZWILLER.

REFERENCES CITED

The following references are of record in the file of this patent:

UNITED STATES PATENTS

| Number | Name | Date |
|---|---|---|
| 1,014,204 | Berchelmann | Jan. 9, 1912 |
| 1,843,313 | Baumann | Feb. 2, 1932 |
| 2,050,662 | Koeberle | Aug. 11, 1936 |
| 2,092,397 | Koeberle | Sept. 7, 1937 |
| 2,134,654 | Lulek | Oct. 25, 1938 |
| 2,211,943 | Wilder | Aug. 20, 1940 |

FOREIGN PATENTS

| Number | Country | Date |
|---|---|---|
| 5,018 | Great Britain | 1899 |
| 221,929 | Switzerland | Sept. 16, 1942 |

OTHER REFERENCES

"Patent Laws of the World," by the Chartered Institute of Patent Agents (London 1911), vol. 2, pages 577, 578.